(12) United States Patent  
Meacham

(10) Patent No.: US 9,126,536 B2  
(45) Date of Patent: Sep. 8, 2015

(54) PIVOTING HANDRAIL SYSTEM

(75) Inventor: William Shane Meacham, Myrtle Beach, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 474 days.

(21) Appl. No.: 12/868,043

(22) Filed: Aug. 25, 2010

(65) Prior Publication Data

US 2012/0048648 A1   Mar. 1, 2012

(51) Int. Cl.
*E04G 5/14* (2006.01)
*B60R 3/00* (2006.01)

(52) U.S. Cl.
CPC .. *B60R 3/005* (2013.01); *E04G 5/14* (2013.01)

(58) Field of Classification Search
CPC .................................. E04G 5/14; B60R 3/005
USPC .................................. 182/113, 83; 280/164.1
See application file for complete search history.

(56) References Cited

U.S. PATENT DOCUMENTS

| | | | | |
|---|---|---|---|---|
| 836,372 | A | * | 11/1906 | Dodds ............................ 105/362 |
| 1,859,338 | A | * | 5/1932 | Murphy ........................ 105/358 |
| 3,853,203 | A | * | 12/1974 | Werner et al. ................. 182/113 |
| 3,880,405 | A | * | 4/1975 | Brueske ........................ 256/59 |
| 4,679,657 | A | | 7/1987 | Bennett |
| 4,759,437 | A | * | 7/1988 | Bevins .......................... 198/632 |
| 5,042,612 | A | | 8/1991 | Bennett |
| 5,182,889 | A | * | 2/1993 | Johnson ........................ 52/298 |
| 5,237,932 | A | * | 8/1993 | Edwards ....................... 104/124 |
| 5,392,878 | A | | 2/1995 | Bennett |
| 6,045,157 | A | * | 4/2000 | Poulin ........................... 280/830 |
| 6,085,867 | A | | 7/2000 | Daniell, III |
| 6,390,152 | B1 | | 5/2002 | Donavan |
| 6,405,831 | B1 | | 6/2002 | Daniell, III |
| 6,502,267 | B2 | | 1/2003 | MacDonald |
| 6,502,709 | B1 | | 1/2003 | Parker |
| 6,527,081 | B1 | | 3/2003 | Tyner |
| 6,609,873 | B2 | | 8/2003 | Just |
| 6,722,489 | B1 | | 4/2004 | Cook |
| 6,772,860 | B1 | | 8/2004 | Nelson |
| 6,814,522 | B1 | | 11/2004 | Daniell, III |
| 6,923,140 | B1 | | 8/2005 | Cook |
| 7,077,237 | B1 | * | 7/2006 | Haake ........................... 182/113 |
| 7,140,467 | B2 | | 11/2006 | Cook |
| 7,216,741 | B2 | | 5/2007 | MacDonald |
| 7,448,470 | B2 | | 11/2008 | Brown |
| 7,516,575 | B2 | * | 4/2009 | Cuccurullo ..................... 52/20 |
| 2003/0020253 | A1 | * | 1/2003 | Bosman et al. ............. 280/164.1 |
| 2007/0055413 | A1 | | 3/2007 | McCullough |
| 2007/0125600 | A1 | | 6/2007 | Bennett |
| 2007/0209873 | A1 | | 9/2007 | Bennett |
| 2009/0256380 | A1 | | 10/2009 | Bennett |

FOREIGN PATENT DOCUMENTS

AU   9873988 A   *   1/1999
FR   2353416 B1   *   3/1979

* cited by examiner

*Primary Examiner* — Alvin Chin-Shue
(74) *Attorney, Agent, or Firm* — Amy Allen Hinson; John B. Hardaway, III; Nexsen Pruet, LLC

(57) ABSTRACT

An apparatus for providing safe access to the upper surface of a mobile container. The apparatus includes a pivoting handrail system having a walk surface, a first set of rails and a second set of rails both capable of being raised and lowered between a raised access position and a lowered stored position, a first pull for raising and lowering the first set of rails, a second pull for raising and lowering the second set of rails, and a support device for supporting the walk surface and attaching to the mobile container. An access such as a ladder may be attached to the pivoting handrail system to provide access to the pivoting handrail system.

42 Claims, 6 Drawing Sheets

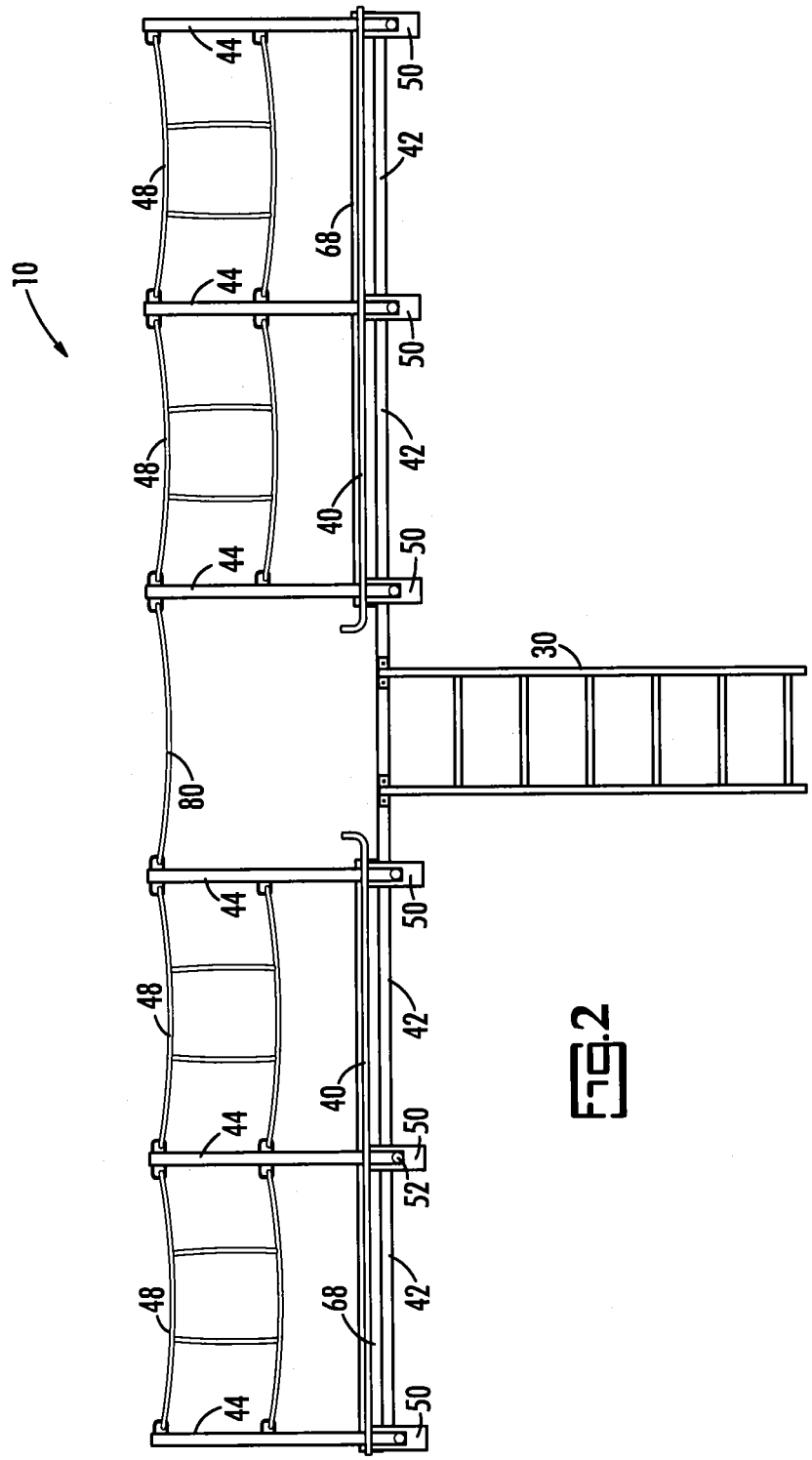

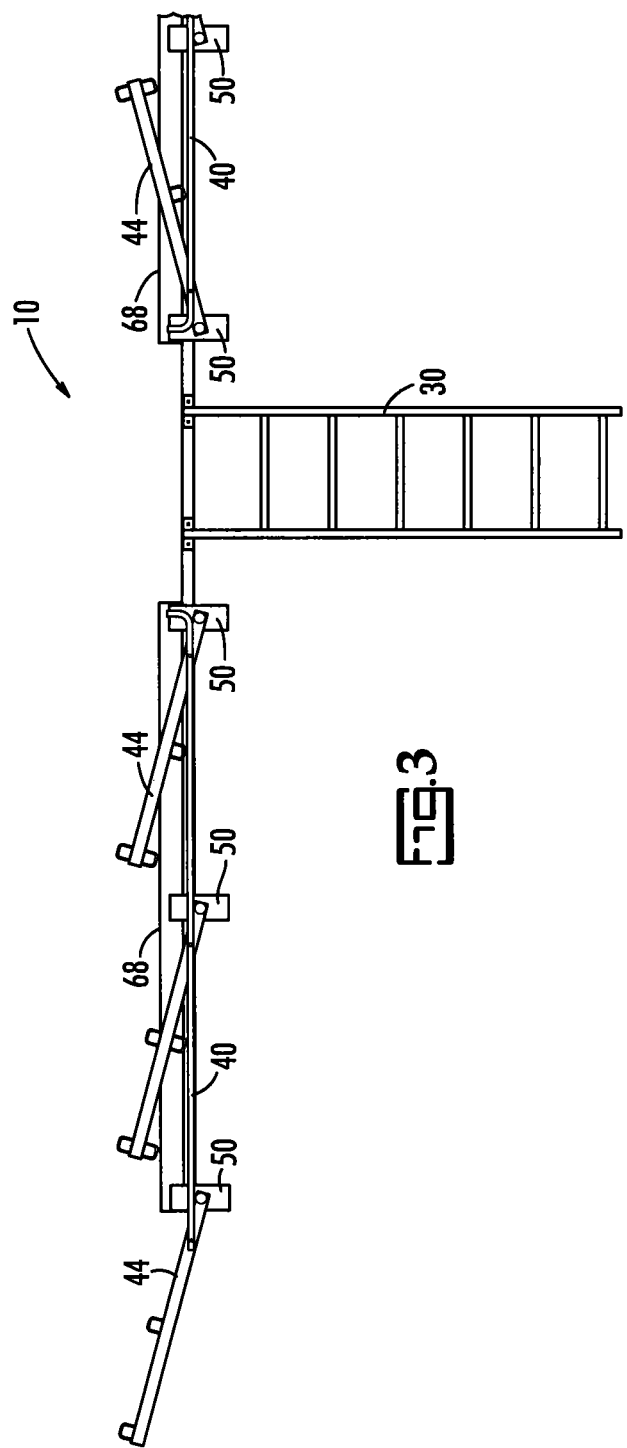

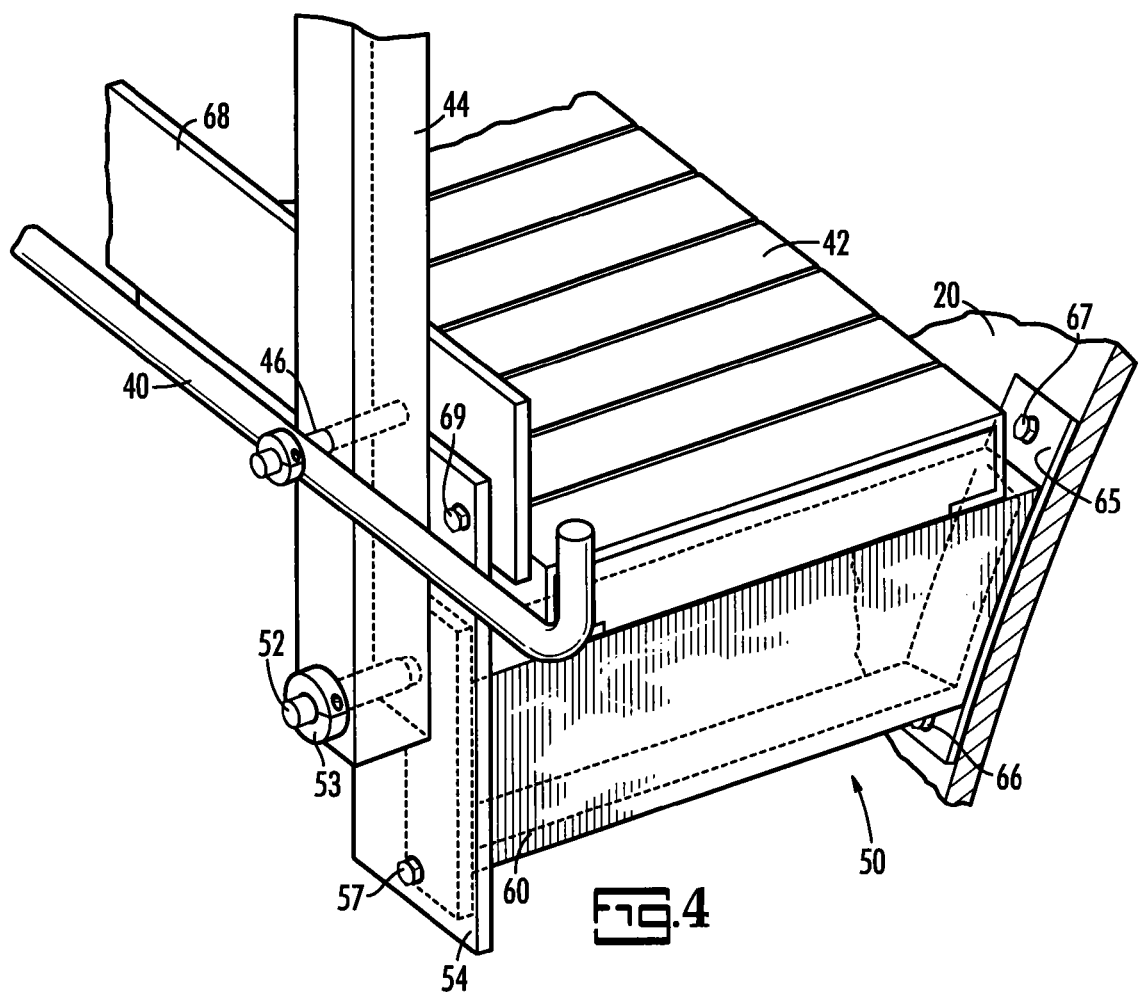

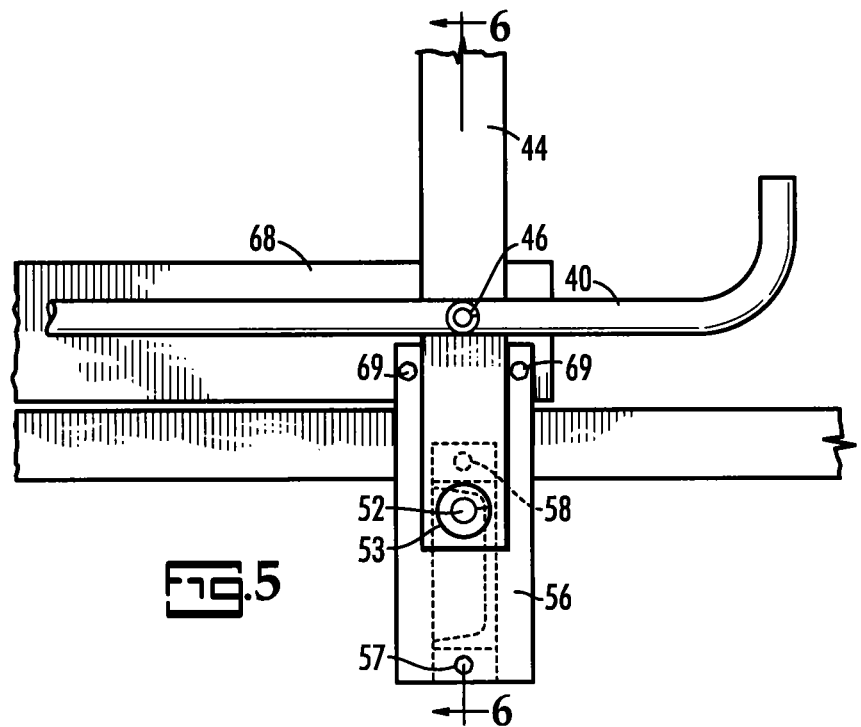
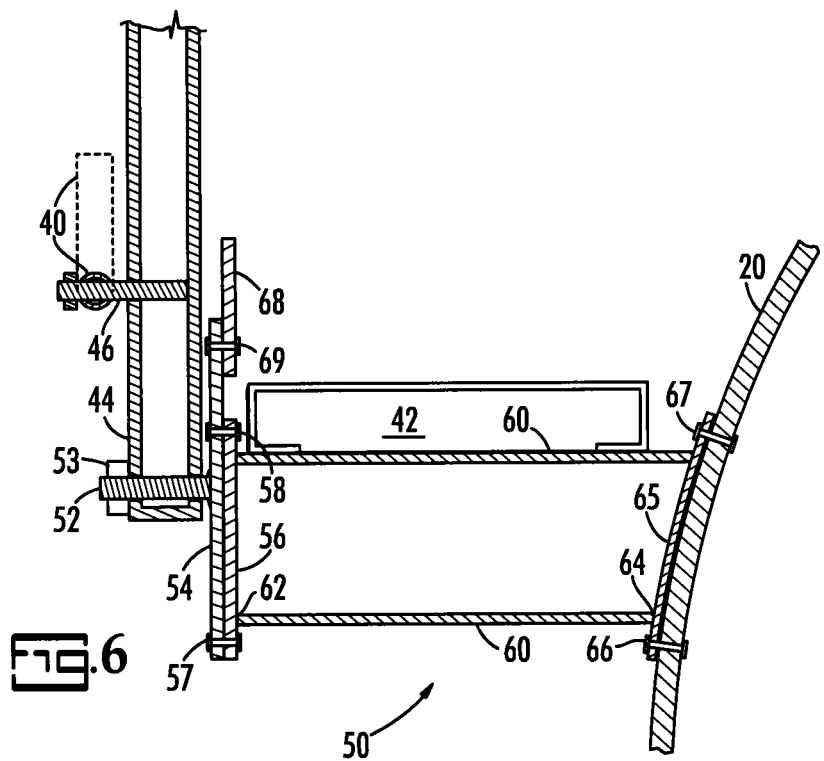

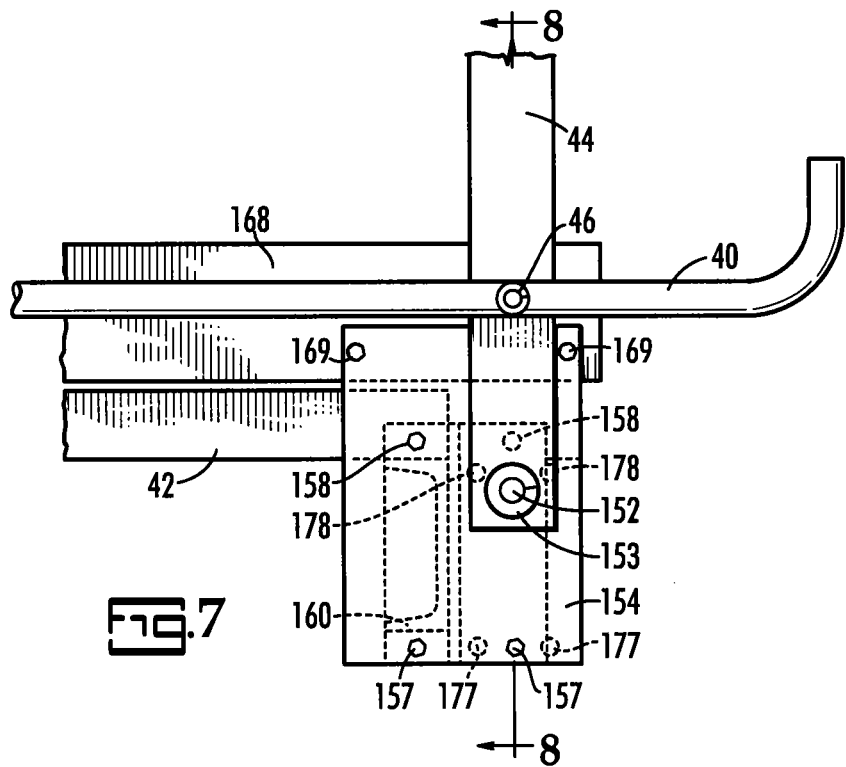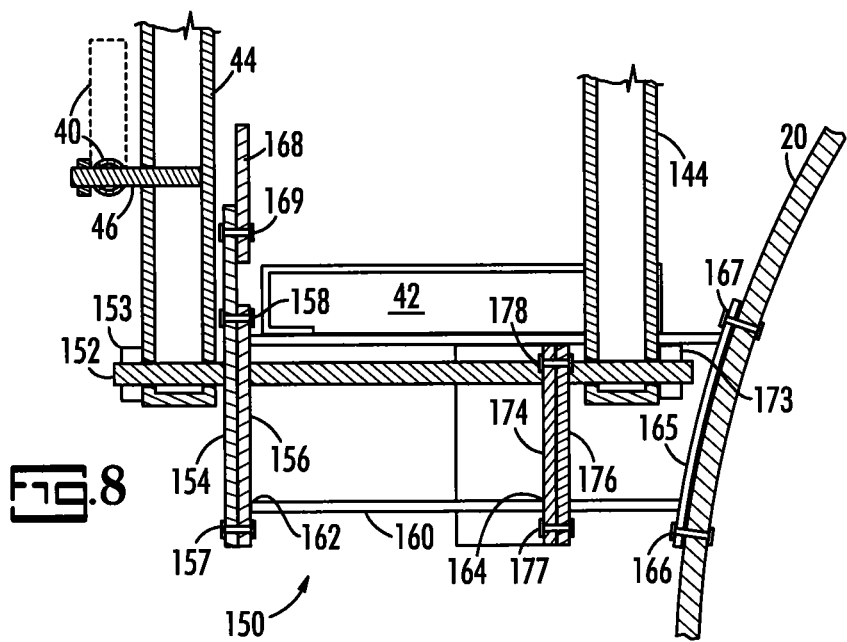

PIVOTING HANDRAIL SYSTEM

BACKGROUND

The present invention is related to a pivoting handrail system for use in accessing the upper surface of a mobile container. Workers frequently require access to the upper surface of tanker trucks to perform daily maintenance and other tasks including opening and closing the hatches before and after loading, respectively. Accessing the upper surface of tanker trucks, however, is often a hazardous and dangerous task for a worker. The upper surface of the tank is typically cylindrical and often slippery causing frequent slips and falls by workers. Because of these hazardous conditions, it is known in the art to use fall protection/prevention measures such as safety cages to protect the worker.

Many of the larger loading stations however do not provide tanker truck access areas. Thus, a worker may perform checks and maintenance without any access and/or safety equipment. Alternatively, a worker may perform maintenance outside of the loading station facility by finding and driving to an access station having a safety cage both prior to and after loading to have the hatch opened and closed.

Standard safety cages, however, are ineffective and cumbersome to use. Typically several hatches are spaced along the upper surface of the tanker truck. If a retractable cage is used to provide fall protection while the worker is addressing each hatch, the cage must be placed over one hatch at a time. This typically means that, after the workman is finished with one hatch, he must exit the cage, raise the cage, move the cage along the length of the tank to the next hatch, lower the cage over the next hatch, and reenter the cage to access the hatch. Alternatively, instead of moving the cage from one hatch to the next, the tank can be moved beneath the cage, but raising and lowering the cage is still necessary. Both of these alternatives are tedious and time consuming. Another alternative is a fall protection cage that is large enough to cover multiple hatches. These cages have a deficiency in that the worker is not sufficiently surrounded by accessible handrails and the length of the cage may extend further than the extent of the tank being serviced, which creates a safety problem since the worker may fall into the void between the furthest rearward, or forward, extent of the tank and the cage.

Thus there is a need in the art for an efficient and effective device that provides safe access to the upper surface of a mobile container and particularly a tanker truck.

SUMMARY

The present invention provides a pivoting handrail system particularly suitable for use on the side of a mobile container such as a tanker truck. In one embodiment of the present invention, the apparatus includes a pivoting handrail system and an attached access for accessing the pivoting handrail system. The pivoting handrail system includes a walk surface having a first side, an opposing second side, a first end, and an opposing second end that is positioned adjacent to the mobile container. The pivoting handrail system further includes a first set of rails positioned on the first side and first end of the walk surface and capable of being raised and lowered between an access and a stored position. A first pull attaches to the first set of rails and raises and lowers the first set of rails between the access and stored position. The pivoting handrail system includes a second set of rails positioned on the second opposing side and first end of the walk surface and also capable of being raised and lowered between an access and a stored position. A second pull attaches to the second set of rails and raises and lowers the second set of rails between the access and stored position. Moreover, the pivoting handrail system includes a support device positioned below the walk surface for supporting the walk surface and attaching the pivoting handrail system to the mobile container.

BRIEF DESCRIPTION OF THE DRAWINGS

FIG. 2 is a front view of the pivoting handrail system according to one embodiment of the present invention in the raised access position.

FIG. 3 is a partial front view of the pivoting handrail system according to one embodiment of the present invention in the lowered stored position.

FIG. 4. is a perspective view of a middle portion of the pivoting handrail system including support device according to one embodiment of the present invention.

FIG. 5 is a front view of a middle portion of the pivoting handrail system and support device according to one embodiment of the present invention.

FIG. 6 is a cross-sectional view of the middle portion of the pivoting handrail system and support device taken along line 6 of FIG. 5.

FIG. 7 is a front view of an end portion of the pivoting handrail system and support device according to one embodiment of the present invention.

FIG. 8 is a cross-sectional view of the end portion of the pivoting handrail system and support device taken along line 8 of FIG. 7.

DESCRIPTION OF REPRESENTATIVE EMBODIMENTS

Figure 1:
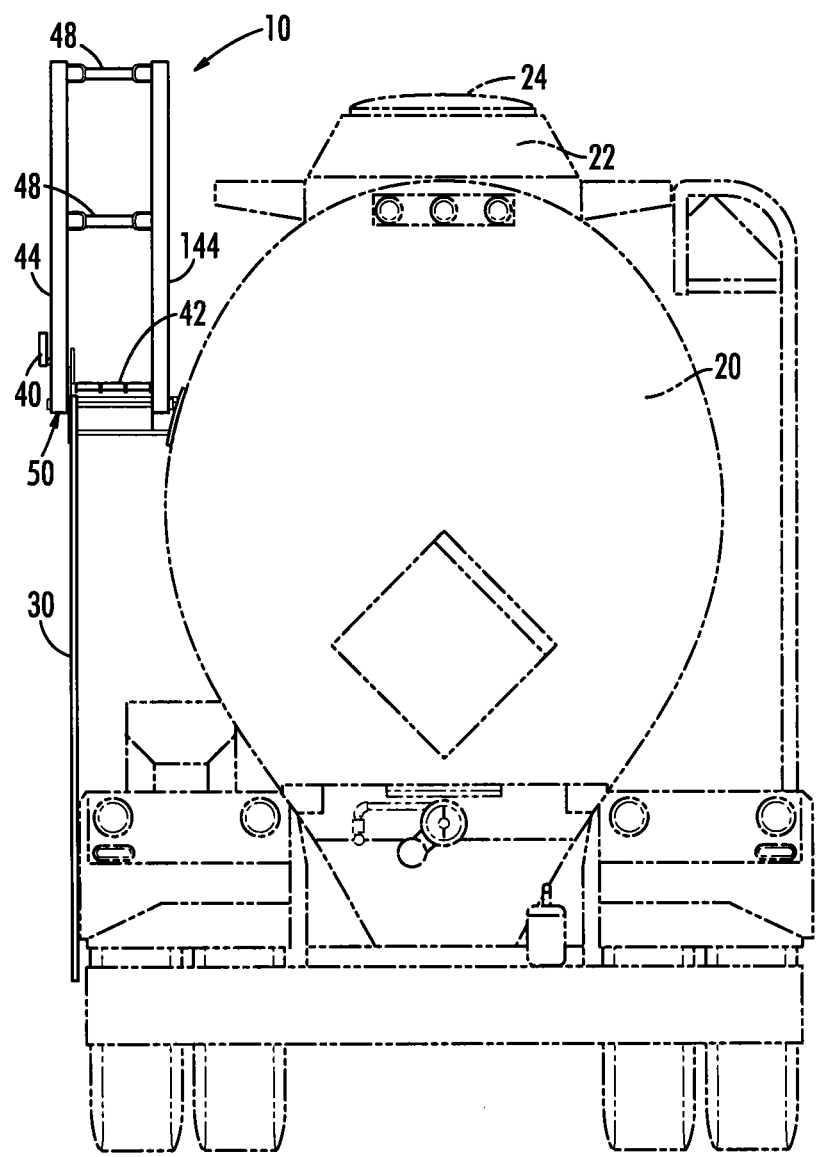
FIG. 1 is a rear view of a tanker truck with an embodiment of the pivoting handrail system of the present invention attached thereto in the raised access position.

The present invention is related to a pivoting handrail system that is particularly suitable for use on the upper side and surface of mobile containers such as tanker trucks. As will be realized from the below description, the pivoting handrail system of the present invention is simple to operate, easy to maintain, and provides efficient and effective fall protection and prevention for workers accessing the upper surface of mobile containers. Moreover, the pivoting handrail system includes a limited number of moving parts, which significantly reduces deterioration, malfunction, and lock-ups typically caused by snow, salt, road grime, and other debris that mobile containers frequently encounter while on the road. Because the pivoting handrail system of the present invention is pivotable between a raised access position and a lowered stored position, workers have maximum access and fall protection when accessing the upper surface of mobile containers and the system does not interfere with access to loading/unloading stations or create issues when a mobile container is driven under bridges, overpasses, and the like. Thus, the pivoting handrail system of the present invention allows workers to access the upper surface of mobile containers in a safe manner while maintaining a sleek and low profile design when the system is not in use.

Although primarily described herein in terms of its use with tanker trucks, it will be clear that the present invention can also be used in connection with a variety of other mobile containers, including but not limited to railroad tank cars and shipping containers. Moreover, for mobile containers utilizing hatches on the upper surface, the present invention also provides safe simultaneous access to multiple hatches, and more preferably all of the hatches, on the upper surface of the container. The invention will be described with reference to the figures forming an integral non-limiting part of the instant specification. Throughout the description similar elements will be numbered accordingly.

FIG. 1 illustrates a rear view of a standard tanker truck vehicle 20, such as a bulk material tank truck. Typical tanker trucks have at least one hatch 22 positioned on the upper surface that includes a hatch cover 24, which pivots on a hinge between an open and closed position when the tanker is loaded and, at times, unloaded. Other features are also frequently present on the upper surface of the tanker truck 20. Thus, access to the upper surface is often necessary for both maintenance and to allow loading and sometimes unloading of the tanker truck 20.

In order to enhance the safety of workers who need to access the upper surface of the tanker truck 20, a pivoting handrail system 10 that is pivotable between a raised access position as shown in FIG. 2 and a lowered stored position as partially shown in FIG. 3 is provided. As shown in FIG. 1, the pivoting handrail system 10 is designed to be attached to the upper side of the tanker truck 20 and is accessible by an access such as a ladder 30, which is preferably an aluminum ladder, or a lift, which is attached to the pivoting handrail system 10. Ladder 30 is preferably positioned at the midsection of the tank of tanker truck 20 (described herein simply as the "tanker truck") and pivoting handrail system 10. The pivoting handrail system 10 further includes pulls such as handles 40 positioned on both sides of the ladder 30 and a rigid walk surface 42 positioned between ladder 30 and tanker truck 20. Preferably walk surface 42 extends the entire length of the tanker truck 20 and is wide enough for a worker to comfortably stand on the walk surface 42 and access the upper surface of the tanker truck 20. Further, walk surface 42 is preferably an aluminum grating walk surface.

As shown in FIGS. 2 and 4-6, on the outer surface of the walk surface 42, the pivoting handrail system 10 further includes pivotable rails 44 that are preferably rotatably secured to a respective handle 40 by upper shaft 46. Handles 40 are preferably attached to the lower end of pivotable rails 44 but above walk surface 42. In the embodiment shown, all of the pivotable rails 44 are connected by a respective handle 40. In an alternative embodiment, only some of the pivotable rails are attached by a respective handle 40 and other attaching devices are used to connect the remaining pivotable rails.

Horizontal rails 48 are preferably positioned between each pivotable rail 44 of a respective handle 40 on each side of ladder 30 to provide a grab and fall protection surface for a worker positioned on the walk surface 42. A preferably reversible removable horizontal rail 80 is positioned between the respective pivotable rails 44 adjoining ladder 30 to provide added fall protection above ladder 30 when the pivoting handrail system 10 is in the raised access position and a worker is on the walk surface 42. The removable horizontal rail 80 may be removable to provide free access to the walk surface 42. Removability is particularly preferred if the pivotable rails of the respective handles angle in the opposing direction such as shown in FIG. 3 when lowered to the stored position.

In a particularly preferred embodiment, pivotable rails 44 are each hollow square and/or round tubes formed from a rigid material such as aluminum. Handles 40 are also preferably hollow square and/or rounds tubes or pipes that are bent upward at the ends nearest ladder 30 to provide a comfortable gripping surface for a worker transitioning the system 10 between the stored and access positions. Preferably handles 40 are smaller in diameter than the pivotable rails 44. Moreover, upper shaft 46 is preferably a stainless steel bolt having a locking collar that extends through a respective handle 40 and pivotable rail 44 with washers and/or spacers preferably made from nylon positioned as needed between the parts. Enclosed bearings may also be pressed into pivotable rail 44 for encompassing upper shaft 46 to reduce and/or eliminate dirt and debris contamination. Horizontal rails 48 are preferably made from high strength webbing and connected by locking carabineer clips.

As shown in the embodiment represented in FIGS. 4 through 6, pivotable rails 44 are rotatably secured below walk surface 46 on a lower shaft 52 having a locking collar 53. Lower shaft 52 is also affixed to a support device 50 for supporting walk surface 42 and attaching to tanker truck 20. Preferably the lower shaft 52 is made from stainless steel and is welded to a portion of support device 50 as shown in FIG. 6, but other affixing means such as bolting may be used without departing from the scope of the invention. Further, pivotable rails 44 preferably include enclosed bearings such as press-in bearings that encompass lower shaft 52 to reduce and/or eliminate dirt and debris contamination and to facilitate rotation and reduce wear.

In one embodiment such as shown in FIGS. 4 through 6, support device 50 includes a plate 54, which is preferably a ¼ inch stainless steel plate, that is affixed to preferably an approximately the same depth plate 56, which is preferably a galvanized steel plate. As shown in FIGS. 5 and 6, the plates 54 and 56 are attached by bolts 57 and 58. Lower shaft 52 is preferably welded to plate 54 and a spacer, such as a nylon spacer, is preferably included between pivotable rail 44 and the weld of lower shaft 52 and plate 54. Further, plate 56 is preferably welded to a first end 62 of a channel 60, which in this embodiment is a c-channel, preferably made from galvanized steel, that extends from plate 56 to the tanker truck 20. Channel 60 supports walk surface 42 and at the opposing end 64 is affixed to plate 65, which is preferably an ⅛ inch plate, such as by welding. Plate 65 is then attached to tanker truck 20 by means such as bolts 66 and 67. Plate 54 is preferably larger in width and height than plate 56 so that it extends above plate 56 and walk surface 42 and is attached to a toe board 68 by preferably bolts 69. Toe board 68 provides added fall protection around the walk surface by alerting a worker when his or her foot reaches the edge of the walk surface 42. Toe board 68 is preferably approximately four inches in height and as shown in FIGS. 2 and 3, preferably extends the length of each handle 40. Alternatively, toe board 68 extends the entire length of walk surface 42 and/or is located at the opposing edges of the walk surface 42. Washers and/or spacers preferably made of nylon may be positioned as needed between the parts of the support device 50 to distribute load and reduce wear on the parts.

The pivoting handrail system also preferably includes a locking mechanism mounted on or near the ladder 30 and handles 40 that locks the pivotable rails 44 in the raised access position and the lowered stored position. Including a locking mechanism also increases system stability and reduces vibration. Standard locking devices known in the art may be used such as a spring loaded pin device whereby the pin protrudes through a hole to lock the pivoting handrail system in the access and/or stored position and then is pressed into the hole and rotated to allow the pivoting handrail system to transition between the access and/or stored positions.

The pivoting handrail system 10 is easily raised to the access position shown in FIGS. 1 and 2 and lowered to the stored position shown in FIG. 3 by handles 40 positioned on both sides of ladder 30 that extend to the respective ends of tanker truck 20. When a worker seeks to access the walk surface 42 of the pivoting handrail system 10 illustrated in FIGS. 2 and 3, the worker simply locates and climbs ladder 30. The worker then pulls both handles 40 inward towards the ladder 30, causing the pivotable rails 44 to rotate around lower shaft 52 and upper shaft 46 until pivotable rails 44 on both sides of the ladder 30 are locked in the vertical upright position and approximately perpendicular to handle 40. The worker may then access the walk surface 42 of the pivoting handrail system 10, which is now in the raised access position shown in FIG. 2. Once the worker has accessed walk surface 42, removable horizontal rail 80 may be positioned between adjoining pivotable rails 44 on opposing sides of ladder 30 to add additional fall protection at the ladder access. The worker may then freely and safely perform routine task and maintenance and walk the length of the tanker truck 20 while being entirely enclosed by the pivoting handrail system 10.

When the worker has completed the necessary tasks on the upper surface of the tanker truck 20, the worker removes or unhooks removable handle 80 and accesses ladder 30. While on ladder 30, the worker pushes handles 40 outward away from the ladder 30, causing the pivotable rails 44 to again rotate in the opposite direction around lower shaft 52 and upper shaft 46 until pivotable rails 44 on both sides of the ladder 30 are locked in an angled position to handle 40. Preferably the pivotable rails 44 are at an angle low enough to allow the upper end of pivotable rails 44 to be positioned lower than the upper surface of the tanker truck 20 so that the pivotable rails 44 do not interfere when the worker is accessing loading/unloading stations or create issues when the tanker truck is driven under bridges, overpasses, and the like. Because the pivoting handrail system 10 is now in the sleek and low profile stored position shown in FIG. 3, the worker may climb down the ladder 30 and resume other tasks.

In an alternative embodiment, handles 40 are pushed outward away from the ladder to raise the pivotable rails 44 of the pivoting handrail system 10 from the lowered stored position to the raised access position. The handles 40 are then pushed inward towards the ladder to lower the pivotable rails 44 of the pivoting handrail system 10 from the raised access position to the lowered stored position. Other handle configurations may also be utilized without departing from the spirit and scope of the present invention.

In the embodiment shown in FIGS. 1, 7, and 8, the pivoting handrail system 10 includes inside pivotable rails 144, which pivot between a raised access position and a lowered stored position with pivotable rails 44. Preferably, inside pivotable rails 144 are included only at the opposing ends of pivoting handrail system 10 at the front and back of tanker truck 20 to ensure that workers do not walk or fall off the ends of walk surface 42. Horizontal rails 48 that provide grab and fall protection are positioned between adjoining pivotable rails 44 and inside pivotable rails 144 of a respective handle 40. Horizontal rails 48 may also be positioned between adjoining inside pivotable rails 144 if multiple inside pivotable rails 144 are used. Similar to pivotable rails 44, inside pivotable rails 144 are each preferably hollow tubes formed from a rigid material such as aluminum.

In the embodiment shown in FIGS. 7 and 8, inside pivotable rails 144 are affixed to a support device 150 at the end of walk surface 42. Lower shaft 152 is longer than shaft 52 and connects pivotable rail 44 and inside pivotable rail 144 by extending through pivotable rail 44, outer plates 154 and 156, inner plates 174 and 176, and inside pivotable rail 144. Outer plates 154 and 156 are affixed together, preferably by bolts 157 and 158, and inner plates 174 and 176 are affixed together, preferably by bolts 177 and 178. In an alternative embodiment, only one outer plate and one inner plate is utilized. In the embodiment shown in FIGS. 7 and 8, walk surface 42 stops prior to pivotable rails 44 and 144. Thus, outer plates 154 and 156 are wider than plates 54 and 56 so that outer plates 154 and 156 affix to both channel 160 and pivotable rail 44. Outer lock collar 153 and inner lock collar 173 are positioned on the opposing ends of the lower shaft 152 to secure the pivotable rails 44 and 144 and support device 150.

Like the embodiment discussed above, channel 160 supports walk surface 42 and has a first end 162 affixed to plate 156 and a second opposing end 164 affixed to plate 165, such as by welding. Plate 165 is attached to tanker truck 20 such as by bolts 166 and 167. Like the embodiment discussed above, plate 154 extends above plate 156 and walk surface 42 and is attached to a toe board 168 by bolts 169. Further, like toe board 68, toe board 168 provides added fall protection around the walk surface by alerting a worker when his or her foot reaches the edge of the walk surface 42. As shown in FIGS. 7 and 8, toe board 168 extends the length of each handle 40. Alternatively, toe board 168 extends between pivotable rail 44 and inside pivotable rail 144 and/or extends around the entire perimeter of walk surface 42. Washers and/or spacers preferably made from nylon may be positioned as needed between the parts of the support device 150 to distribute load and reduce wear on the parts. Because pivotable rails 44, which are connected to handle 40, and inside pivotable rail 144 are connected by lower shaft 152, inside pivotable rail 144 raises and lowers with pivotable rails 44.

Other attaching, affixing, and connecting techniques and dimensions, configurations, quantities, and material compositions for the plates, rails, shafts, channels, and the like may be utilized without departing from the spirit and scope of the present invention. Moreover, there are a number of suitable support device configurations that may be utilized to support the walk surface and attach to the tanker truck 20. The configuration shown in the drawings are but one of these configurations and other configurations could be employed to demonstrate the invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

The invention claimed is:
1. An apparatus for providing safe access to the upper surface of a mobile container, said apparatus comprising:
a pivoting handrail system including:

a walk surface having a first side and an opposing second side and a first end and an opposing second end, said opposing second end for positioning adjacent to a mobile container, a first set of rails positioned on said first side and said first end of said walk surface, said first set of rails capable of being raised and lowered between an access and a stored position, said first set of rails comprising at least a first and a second rail, a first pull secured to at least said first rail of said first set of rails that raises and lowers said first set of rails between said access and said stored position, said first pull having a first handle, a second set of rails positioned on said opposing second side and said first end of said walk surface, said second set of rails capable of being raised and lowered between said access and said stored position, said second set of rails comprising at least a first and a second rail, a second pull secured to at least said first rail of said second set of rails that raises and lowers said second set of rails between said access and said stored position, said second pull having a second handle, a third rail positioned on said first side and said opposing second end of said walk surface, said third rail capable of being raised and lowered between said access and said stored position by said first pull and moves in conjunction with said first set of rails, said third rail pivotably attached to said first rail of said first set of rails by a connecting shaft extending between said third rail and said first rail of said first set of rails, and a support device positioned underneath said walk surface for supporting said walk surface and for attaching said pivoting handrail system to a side of said mobile container, wherein said side of said mobile container is not the upper surface of said mobile container; and an access attached to said pivoting handrail system for accessing said pivoting handrail system.

2. The apparatus of claim 1 wherein said access is a ladder.

3. The apparatus of claim 1 wherein said first and second set of rails are approximately perpendicular to said walk surface when in said access position.

4. The apparatus of claim 1 wherein said pivoting handrail system is secured at said opposing second end to said mobile container below the upper surface of said mobile container.

5. The apparatus of claim 4 wherein said first and second set of rails are at an angle to said walk surface when in said stored position.

6. The apparatus of claim 5 wherein said apparatus further comprises said mobile container and said first and second set of rails are entirely below said upper surface of said mobile container when in said stored position.

7. The apparatus of claim 1 wherein said first pull is attached to said first rail of said first set of rails by a first shaft.

8. The apparatus of claim 7 wherein said second pull is attached to said first rail of said second set of rails by a second shaft.

9. The apparatus of claim 1 wherein said first pull extends along said walk surface and is directly attached to multiple rails of said first set of rails by a first shaft at each of said multiple rails of said first set of rails.

10. The apparatus of claim 9 wherein said second pull extends along said walk surface and is directly attached to multiple rails of said second set of rails by a second shaft at each of said multiple rails of said second set of rails.

11. The apparatus of claim 1 wherein said first rail of said first set of rails is pivotably attached to said support device by a first shaft.

12. The apparatus of claim 11 wherein said support device comprises a first plate attached to said first shaft, a second plate attached to said first plate, a channel attached to said second plate and extending below said walk surface, and a third plate for attaching to said mobile container.

13. The apparatus of claim 12 wherein a toe board positioned above said walk surface is attached to said first plate.

14. The apparatus of claim 11 wherein said first rail of said second set of rails is pivotably attached to said support device by a second shaft.

15. The apparatus of claim 14 wherein said support device comprises a first plate attached to said first shaft, a second plate attached to said first plate, a first channel attached to said second plate and extending below said walk surface, and a third plate for attaching to said mobile container.

16. The apparatus of claim 15 wherein said support device further comprises a fourth plate attached to said second shaft, a fifth plate attached to said fourth plate, a second channel attached to said fifth plate and extending below said walk surface, and a sixth plate for attaching to said mobile container.

17. The apparatus of claim 16 wherein a toe board positioned above said walk surface is attached to said first plate and said fourth plate.

18. The apparatus of claim 1 wherein multiple rails of said first set of rails are each joined by a first horizontal rail extending therebetween.

19. The apparatus of claim 18 wherein multiple rails of said second set of rails are each joined by a second horizontal rail extending therebetween.

20. The apparatus of claim 19 wherein said first rail of said first set of rails and said first rail of said second set of rails are joined by a removable horizontal rail extending therebetween when said pivoting handrail system is in the access position.

21. The apparatus of claim 18 wherein said horizontal rails comprise webbing material.

22. The apparatus of claim 1 wherein said support device is completely below said walk surface.

23. An apparatus for providing safe access to the upper surface of a mobile container, said apparatus comprising:

a pivoting handrail system including:

a walk surface having a first side and an opposing second side and a first end and an opposing second end, said opposing second end for positioning adjacent to a mobile container, a first set of rails positioned on said first side and said first end of said walk surface, said first set of rails capable of being raised and lowered between an access and a stored position, a first pull secured to said first set of rails that raises and lowers said first set of rails between said access and said stored position, said first pull having a first handle, a second set of rails positioned on said opposing second side and said first end of said walk surface, said second set of rails capable of being raised and lowered between said access and said stored position, a second pull secured to said second set of rails that raises and lowers said second set of rails between said access and said stored position, said second pull having a second handle, a third rail positioned on said first side and said opposing second end of said walk surface, said third rail capable of being raised and lowered between said access and said stored position by said first pull and moves in conjunction with said first set of rails, said third rail is pivotably attached to a first rail of said first set of rails by a connecting shaft extending between said third rail and said first rail of said first set of rails, a fourth rail positioned on said opposing second side and said opposing second end of said walk surface, said fourth rail capable of being raised and lowered between said access and said stored position by said second pull and moves in conjunction with said second set of rails, and a support device extending from said first end of said walk surface to said opposing second end of said walk surface and positioned underneath said walk surface for supporting said walk surface and for attaching said pivoting handrail system to a side of said mobile container, wherein said side of said mobile container is not the upper surface of said mobile container; and an access attached to said pivoting handrail system for accessing said pivoting handrail system.

24. The apparatus of claim 23 wherein said first and second set of rails and said third and fourth rails are approximately perpendicular to said walk surface when in said access position.

25. The apparatus of claim 23 wherein said pivoting handrail system is secured at said opposing second end to said mobile container below the upper surface of said mobile container.

26. The apparatus of claim 25 wherein said first and second set of rails and said third and fourth rails are each at non-perpendicular angles to said walk surface when in said stored position.

27. The apparatus of claim 26 wherein said apparatus further comprises said mobile container and said first and second set of rails and said third and fourth rails are entirely below said upper surface of said mobile container when in said stored position.

28. The apparatus of claim 23 wherein said first pull is secured to at least said first rail and a second rail of said first set of rails.

29. The apparatus of claim 28 wherein said support device comprises a first plate, a second plate attached to said first plate, a channel attached to said second plate and extending below said walk surface, a third plate, a fourth plate attached to said third plate, and a fifth plate for attaching to said mobile container, said first shaft extends through said first, second, third, and fourth plates.

30. The apparatus of claim 29 wherein a toe board positioned above said walk surface is attached to said first plate.

31. The apparatus of claim 28 wherein said fourth rail is pivotably attached to a first rail of said second set of rails by a second shaft extending between said fourth rail and said first rail of said second set of rails, said second pull secured to at least said first rail and a second rail of said second set of rails.

32. The apparatus of claim 28 wherein said support device comprises a first plate, a second plate attached to said first plate, a channel attached to said second plate and extending below said walk surface, a third plate, a fourth plate attached to said third plate, and a fifth plate for attaching to said mobile container, said second shaft extends through said first, second, third, and fourth plates.

33. The apparatus of claim 32 wherein a toe board positioned above said walk surface is attached to said first plate.

34. An apparatus for providing safe access to the upper surface of a mobile container, said apparatus comprising:

a walk surface having a first side and an opposing second side and a first end and an opposing second end, said opposing second end for positioning adjacent to a mobile container, wherein said walk surface is for positioning below the upper surface of said mobile container;

a first set of rails positioned on said first side and said first end of said walk surface, said first set of rails capable of being raised and lowered between an access and a stored position;

a first pull attached to at least a first and a second rail of said first set of rails that raises and lowers said first set of rails between said access and said stored position, said first pull is attached to a first rail of said first set of rails by a first shaft;

a second set of rails positioned on said opposing second side and said first end of said walk surface, said second set of rails capable of being raised and lowered between said access and said stored position;

a second pull attached to at least a first and a second rail of said second set of rails that raises and lowers said second set of rails between said access and said stored position, said second pull is attached to said first rail of said second set of rails by a second shaft;

a third rail positioned on said first side and said opposing second end of said walk surface, said third rail capable of being raised and lowered between said access and said stored position by said first pull and moves in conjunction with said first set of rails, said third rail pivotably attached to said first rail of said first set of rails by a connecting shaft extending between said third rail and said first rail of said first set of rails, and a support device positioned underneath said walk surface for supporting said walk surface and for attaching said pivoting handrail system to a side of said mobile container, wherein said side of said mobile container is not the upper surface of said mobile container, said support device is pivotably attached to said first rail of said first set of rails by a third shaft, and said support device is pivotably attached to said first rail of said second set of rails by a fourth shaft; and an access way for accessing said walk surface;

wherein said first and second pulls terminate proximate to said access way whereby said first and second sets of rails can be raised and lowered from said access way.

35. The apparatus of claim 34 further comprising a fourth rail positioned on said opposing second side and said opposing second end of said walk surface, said fourth rail capable of being raised and lowered between said access and said stored position in conjunction with said second set of rails.

36. The apparatus of claim 34 wherein said pivoting handrail system is secured at said opposing second end to said mobile container below the upper surface of said mobile container.

37. The apparatus of claim 34 wherein said first pull extends along said walk surface and is directly attached to multiple rails of said first set of rails by said first shaft at each of said multiple rails of said first set of rails.

38. The apparatus of claim 37 wherein said second pull extends along said walk surface and is directly attached to multiple rails of said second set of rails by said second shaft at each of said multiple rails of said second set of rails.

39. The apparatus of claim 34 wherein said support device comprises a first plate attached to said third shaft, a second plate attached to said first plate, a channel attached to said second plate and extending below said walk surface, and a third plate for attaching to said mobile container.

40. The apparatus of claim 39 wherein a toe board positioned above said walk surface is attached to said first plate.

41. The apparatus of claim 39 wherein said support device further comprises a fourth plate attached to said fourth shaft, a fifth plate attached to said fourth plate, a second channel attached to said fifth plate and extending below said walk surface, and a sixth plate for attaching to said mobile container.

42. The apparatus of claim 41 wherein a toe board positioned above said walk surface is attached to said first plate and said fourth plate.

* * * * *